(12) United States Patent
Mori et al.

(10) Patent No.: US 8,987,644 B2
(45) Date of Patent: Mar. 24, 2015

(54) MICROWAVE HEATING APPARATUS

(75) Inventors: Yasuhisa Mori, Nara (JP); Takeshi Takizaki, Nara (JP); Koji Yoshino, Nara (JP); Hiroshi Kawai, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1558 days.

(21) Appl. No.: 12/305,093

(22) PCT Filed: Jun. 18, 2007

(86) PCT No.: PCT/JP2007/062210
§ 371 (c)(1),
(2), (4) Date: Dec. 16, 2008

(87) PCT Pub. No.: WO2007/148644
PCT Pub. Date: Dec. 27, 2007

(65) Prior Publication Data
US 2009/0206071 A1    Aug. 20, 2009

(30) Foreign Application Priority Data
Jun. 19, 2006   (JP) ................................. 2006-169269

(51) Int. Cl.
*H05B 6/70* (2006.01)
*H05B 6/64* (2006.01)
*H05B 6/72* (2006.01)

(52) U.S. Cl.
CPC .............. *H05B 6/6408* (2013.01); *H05B 6/705* (2013.01); *H05B 6/725* (2013.01); *Y02B 40/146* (2013.01)
USPC .......................................... 219/690; 219/749

(58) Field of Classification Search
CPC ...... H05B 6/6408; H05B 6/725; H05B 6/705; Y02B 40/146
USPC ......... 219/690, 660, 702, 710, 745–748, 749, 219/751
See application file for complete search history.

(56) References Cited

U.S. PATENT DOCUMENTS 7,388,180 B2 * 6/2008 Kim et al. ...................... 219/749
2001/0002670 A1 * 6/2001 Omori et al. .................. 219/748
(Continued)

FOREIGN PATENT DOCUMENTS

EP      1 351 557 A2    10/2003
EP      1 434 466 A1    6/2004
(Continued)

OTHER PUBLICATIONS

JP2003-294241A Translation (Nov. 21, 2012) A High Frequency Heating Device http://dossier1.ipdl.inpit.go.jp/cgi-bin/tran_web_cgi_ejje?*
(Continued)

*Primary Examiner* — Quang Van
(74) *Attorney, Agent, or Firm* — Pearne & Gordon LLP

(57) ABSTRACT

A high-frequency heating apparatus of the present invention includes a heating chamber to which a heating plate for loading a subject to be heated thereon is detachably attached, a microwave generating unit, a waveguide for transmitting a microwave from the microwave generating unit, a rotation antenna for radiating the microwave into the heating chamber from the waveguide, a driving unit for turning/driving the rotation antenna, an operating portion capable of choosing the grill menu by which the subject to be heated put on the heating plate is heated and a hot-up menu by which the subject to be heated is heated without the heating plate, and a controlling unit for controlling the driving unit based on an output signal form the operating portion, wherein the controlling unit controls to vary a direction of a sharp portion of a radiation directivity of the rotation antenna in response to the output signal from the operating portion.

18 Claims, 14 Drawing Sheets

(56) References Cited

U.S. PATENT DOCUMENTS

| | | |
|---|---|---|
| 2002/0162836 A1 | 11/2002 | Taino et al. |
| 2003/0121913 A1 | 7/2003 | Hayami et al. |
| 2003/0183624 A1 | 10/2003 | Watanabe et al. |

FOREIGN PATENT DOCUMENTS

| | | | |
|---|---|---|---|
| JP | 09306664 A | * | 11/1997 |
| JP | 10-149877 A | | 6/1998 |
| JP | 10-172750 A | | 6/1998 |
| JP | 2002-110339 A | | 4/2002 |
| JP | 2003-257614 A | | 9/2003 |
| JP | 2003-294241 A | | 10/2003 |
| JP | 2004-071216 A | | 3/2004 |
| JP | 2004-219010 A | | 8/2004 |
| JP | 2004-245441 A | | 9/2004 |
| JP | 2006-286443 A | | 10/2006 |

OTHER PUBLICATIONS

JP2003-257614A Transition (Nov. 21, 2012) A High Frequency Heating Apparatus http://dossier 1.ipdl.inpit.go.jp/cgi-bin/tran_web_cgi_ejje?*

JP09-306664A Translation (Nov. 21, 2012) A High Frequency Heating Device http://dossier 1.ipdl.inpit.go.jp/cgi-bin/tran_web_cgi_ejje?*

International Search Report for PCT/JP2007/062210.

Supplementary European Search Report dated Jun. 25, 2010.

* cited by examiner

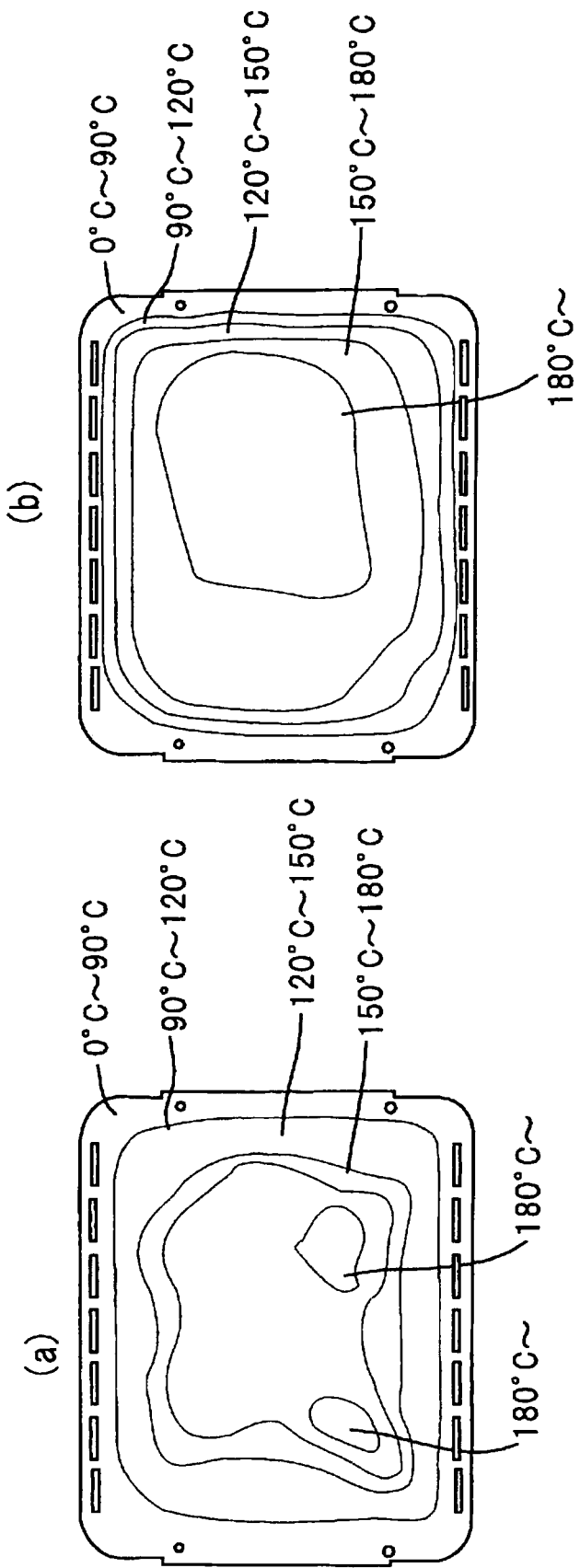

MICROWAVE HEATING APPARATUS

TECHNICAL FIELD

The present invention relates to a microwave heating apparatus for dielectrically heating a subject to be heated.

BACKGROUND ART

The microwave oven as the representative microwave heating apparatus can heat directly the foods as the representative subject to be heated. Therefore, its convenience of needing no cooking pan or pot makes the microwave oven the apparatus indispensable to life. Up to now, the microwave oven having a food loading space, width and depth dimensions of which is about 300 to 400 mm respectively and a height dimension of which is about 200 mm, of the heating chamber through which a microwave propagates is widespread commonly.

In recent years, the products having a laterally wide heating chamber whose food loading space has a flat bottom surface and whose lateral width is widened by setting the width dimension to 400 mm or more relatively larger than the depth dimension such that a plurality of foods can be heated in parallel to enhance its convenience are put to practical use.

Also, on account of the progress of functionality of the microwave oven, the microwave oven equipped with a "grill menu" as well as a so-called "hot-up menu" (a high-frequency heating that heats a food by radiating a microwave to the food) which is traditionally provided is put onto the market. The "grill menu" means a cooking menu to cook the food in a grilling fashion (in which a food is cooked so as to have a crispy surface and a juicy inside) by a method to heat a food via a heating pan by raising a temperature of the heating pan on which the food is put, a method to heat the food by a grilling heater, or their combination.

Traditionally, as shown in FIG. 17, this type of a high-frequency heating apparatus 300 includes a waveguide 303 for propagating a microwave radiated from a magnetron 302 as a representative microwave generating means, a heating chamber 301, a loading table 306 fixed in the heating chamber 301 into which a food (not shown) as a representative subject to be heated is put and made of the low-loss dielectric material such as ceramic, glass, or the like to transmit the microwave easily, an antenna space 310 formed below the loading table 306 in the heating chamber 301, a rotation antenna 305 fitted to the center of the heating chamber 301 from the waveguide 303 to the antenna space 310 to radiate the microwave propagated through the waveguide 303 to the interior of the heating chamber 301, a motor 304 as a representative driving means for turning/driving the rotation antenna 305, a heating plate 308 provided in the heating chamber 301 according to the application, a plate bearing portion 307 for supporting the heating plate 308, and a heater 309 for performing the electric heating.

In the hot-up menu that heats directly the subject to be heated by the high-frequency heating, the high-frequency heating is executed in a situation that the food, or the like is put on the loading table 306. The microwave being radiated from the magnetron 302 is absorbed once by the rotation antenna 305 via the waveguide 303, and then this microwave is radiated toward the heating chamber 301 from an upper surface of the radiation portion of the rotation antenna 305. At this time, in order to stir the microwave uniformly in the heating chamber 301, normally the rotation antenna 305 radiates the microwave while turning at a predetermined speed.

Also, when the grill menu to cook the food in a grilling fashion is chosen, the food (e.g., dark meat, fish, or the like) is put on the heating plate 308 that is supported by the plate bearing portion 307. In this state, a surface portion of the food is heated/processed by the heater 309 positioned on the upper side of the food. Also, a back surface portion of the food is heated/processed by the heating plate 308 whose temperature is raised by the microwave.

In the heating cooking that concentrates the microwave onto the food, moisture contained in the inside of the food is evaporated excessively because of the property of microwave. In contrast, the process of heating the food by both the heater and the heating plate can finish the food in the so-called grilling fashion to finish a surface of the food crisply while confining a moisture or a taste in the inside of the food (see Patent Literature 1).

Patent Literature 1: JP-A-2004-071216

DISCLOSURE OF THE INVENTION

Problems that Invention is to Solve

However, the traditional high-frequency heating apparatus set forth in Patent Literature 1 is constructed such that, when the foregoing grill menu is executed, the microwave is radiated while turning the rotation antenna 305 at a predetermined speed, as in the hot-up menu.

The inventors of the present invention have found the fact that, when the rotation antenna 305 radiates a high-frequency power while turning at a predetermined speed, a part of the high-frequency power radiated does not contribute to a temperature rise of the heating plate 308. This is because the high-frequency power is stirred and radiated to the interior of the heating chamber 301.

Also, in the traditional configuration, such a situation is caused in some case that a part of the microwave radiated to the interior of the heating chamber propagates up to an upper space (space in which the food is put) of the heating plate 308 and then heats directly the food.

In this case, the moisture of the food is evaporated and thus the food is finished to have a dried inside (dried-out finish). This situation gives an undesirable finish depending on the type of the food as the subject to be heated.

The present invention has been made to solve the above problems, and it is an object of the present invention to provide a high-frequency heating apparatus capable of obtaining a desired cooking finish suitable for the type of a subject to be heated and also improving a heating efficiency even when the grill menu is chosen.

Means for Solving the Problems

A high-frequency heating apparatus of the present invention, includes a heating chamber to which a heating plate for loading a subject to be heated thereon is detachably attached; a microwave generating unit; a waveguide for transmitting a microwave from the microwave generating unit; a rotation antenna for radiating the microwave into the heating chamber from the waveguide; a driving unit for turning/driving the rotation antenna; an operating portion capable of choosing a grill menu by which the subject to be heated put on the heating plate is heated and a hot-up menu by which the subject to be heated is heated without the heating plate; and a controlling unit for controlling the driving unit based on an output signal from the operating portion; wherein the controlling unit controls to vary a direction of a sharp portion of a radiation directivity of the rotation antenna in response to the output signal from the operating portion.

According to this configuration, the operation of the rotation antenna is controlled to meet the contents of the cooking menu. Therefore, the microwave is stirred uniformly to heat uniformly the subject to be heated when the hot-up menu is chosen, while the microwave is concentrated onto the suitable location in the heating chamber when the grill menu is chosen. As a result, a desired cooking finish suitable for the type of the subject to be heated can be obtained, and also a heating efficiency can be improved.

Also, in the high-frequency heating apparatus according to the present invention, the controlling unit controls the direction of the sharp portion of the radiation directivity of the rotation antenna such that the microwave is concentrated onto the heating plate when the operating portion chooses the grill menu, and controls the direction of the sharp portion of the radiation directivity of the rotation antenna such that the microwave is concentrated onto the subject to be heated when the operating portion chooses the hot-up menu.

According to this configuration, the operation of the rotation antenna is controlled in accordance with the contents of the cooking menu. Therefore, the microwave is concentrated onto the subject to be heated when the hot-up menu is chosen, while the concentrated location of the microwave is controlled to raise a temperature of the heating plate effectively when the grill menu is chosen. As a result, a desired cooking finish suitable for the type of the subject to be heated can be obtained, and also a heating efficiency can be improved.

Also, in the high-frequency heating apparatus according to the present invention, the heating chamber includes plural stages of plate bearing portions for supporting the heating plate; and the controlling unit controls the direction of the sharp portion of the radiation directivity of the rotation antenna in accordance with a position of the heating plate supported on any one of plural stages when the operating portion chooses the grill menu.

According to this configuration, the cooking menu can be chosen according to the stage position and various foods can be heated/cooked by the "grill menu". For example, when the heating plate is put on the upper stage plate bearing portion, the thin food material such as fish or dark meat can be grilled. When the heating plate is put on the middle stage plate bearing portion, the big food material such as roast beef or roast chicken can be cooked. When the heating plate is put on the lower stage plate bearing portion, the food material such as pizza or paella of which a back surface heating power is needed but an upper surface heating power should be made soft, can be cooked. As a result, the type of the object foods to which the grill cooking is applied can be increased, and a cooking performance can be improved.

Also, the high-frequency heating apparatus according to the present invention further includes a heating unit provided on a top of the heating chamber; wherein the controlling unit causes the heating unit to generate a heat when the sharp portion of the radiation directivity of the rotation antenna is directed such that the microwave is concentrated onto the heating plate.

According to this configuration, the heating given by the heater can also be executed during the grill cooking.

Also, in the high-frequency heating apparatus according to the present invention, the rotation antenna is provided on a bottom portion of the heating chamber and radiates the microwave from the bottom portion of the heating chamber.

According to this configuration, the microwave can be radiated from the lower surface of the heating chamber. Therefore, when the microwave is concentrated onto the heating plate by stopping the rotation antenna in a predetermined position, a quantity of the microwave propagating to the upper space over the heating plate can be reduced.

Also, in the high-frequency heating apparatus according to the present invention, the heating plate has a high-frequency absorber.

According to this configuration, a temperature of the heating plate can be raised effectively by concentrating the microwave onto the high-frequency absorber.

Also, a high-frequency heating apparatus, includes a microwave generating unit; a waveguide for transmitting a microwave from the microwave generating unit; a heating chamber to which a heating plate for loading a subject to be heated thereon is detachably attached, which is connected to an upper portion of the waveguide, and whose width direction dimension is larger than a depth direction dimension; a heater for electrically heating the heating chamber; a non-turn loading table arranged in the heating chamber to load a subject to be heated thereon; a heated subject housing space formed over the loading table in the heating chamber; an antenna space formed below the loading table in the heating chamber; a rotation antenna for radiating the microwave in the waveguide into the heating chamber; a driving unit for turning/driving the rotation antenna; and a controlling unit for controlling a direction of the rotation antenna by controlling the driving unit; wherein the heating plate has a ferrite of a high-frequency absorber on side surfaces of the loading table, the heating chamber has a plate bearing portion for supporting the heating plate in the heated subject housing space, and the controlling unit controls a sharp portion of a radiation directivity of the rotation antenna in a predetermined direction such that the heating plate is concentrated heated by a high-frequency power.

According to this configuration, the operation of the rotation antenna is controlled to meet the contents of the cooking menu. Therefore, the microwave is stirred uniformly to heat uniformly the subject to be heated when the hot-up menu is chosen, while the microwave is concentrated onto the suitable location in the heating chamber when the grill menu is chosen. As a result, a desired cooking finish suitable for the type of the subject to be heated can be obtained, and also a heating efficiency can be improved.

Also, in the high-frequency heating apparatus according to the present invention, the rotation antenna is constructed by two rotation antennas that are arranged in symmetrical positions with respect to a width direction of the heating chamber in the antenna space, and the controlling unit controls the sharp portion of the radiation directivity of at least one rotation antenna out of the two rotation antennas into a predetermined direction.

According to this configuration, a plurality of rotation antennas enable the number of combination in stop positions of the rotation antennas to increase (for example, one rotation antenna is in the origin position, and the other rotation antenna is at 90 degree from the origin in the anticlockwise direction, or the like). Thus, the microwave can also be concentrated much more onto the high-frequency absorber of the heating plate. Therefore, a heating efficiency of the heating plate can be improved. Meanwhile, either a right half or left half area, or an upper half or lower half area of the heating plate can be heated concentratedly, which widens a variation of cooking methods.

Also, the high-frequency heating apparatus according to the present invention further includes a temperature detecting unit for detecting a temperature of the subject to be heated or the heating plate in the heating chamber; wherein the controlling unit controls the rotation antenna based on a detected result of the temperature detecting unit.

According to this configuration, even when the "grill menu" is chosen, the rotation antenna can be turned at a constant speed in the initial stage of the heating starting, and also the rotation antenna can be shifted to the operation control based on the position information stored in the controlling unit when a difference in the temperature distribution in the heating chamber or the heating plate begins to occur.

Also, in the high-frequency heating apparatus according to the present invention, the controlling unit controls the driving unit such that the sharp portion of the radiation directivity of the rotation antenna is stopped in a predetermined position.

According to this configuration, the driving unit can precisely control a stop position of the rotation antenna, which improves a heating efficiency of the heating plate.

Also, in the high-frequency heating apparatus according to the present invention, the controlling unit controls the driving unit such that the sharp portion of the radiation directivity of the rotation antenna is swung near a predetermined position.

According to this configuration, the excessive heating caused when the microwave is concentrated onto a part of the rotation antenna since a stopped condition of the rotation antenna is kept during the radiation of the microwave can be prevented. Even though the rotation antenna is turned within about ±5 degree around a target angle (stop position), a heating efficiency of the heating plate is hardly affected while a sufficient effect of preventing an excessive temperature rise of the antenna component can be achieved.

Also, in the high-frequency heating apparatus according to the present invention, the controlling unit controls the driving unit such that the rotation antenna is turned during the microwave heating and the sharp portion of the radiation directivity is decelerated near a predetermined position.

According to this configuration, the excessive heating caused when the microwave is concentrated onto a part of the rotation antenna since a stopped condition of the rotation antenna is kept during the radiation of the microwave can be prevented.

Advantages of the Invention

According to the present invention, the high-frequency heating apparatus capable of obtaining a desired cooking finish suitable for the type of a subject to be heated and also improving a heating efficiency even when the grill menu is chosen can be provided.

BRIEF DESCRIPTION OF THE DRAWINGS

FIG. 10B A reference view of FIG. 10A.

Figure 1:
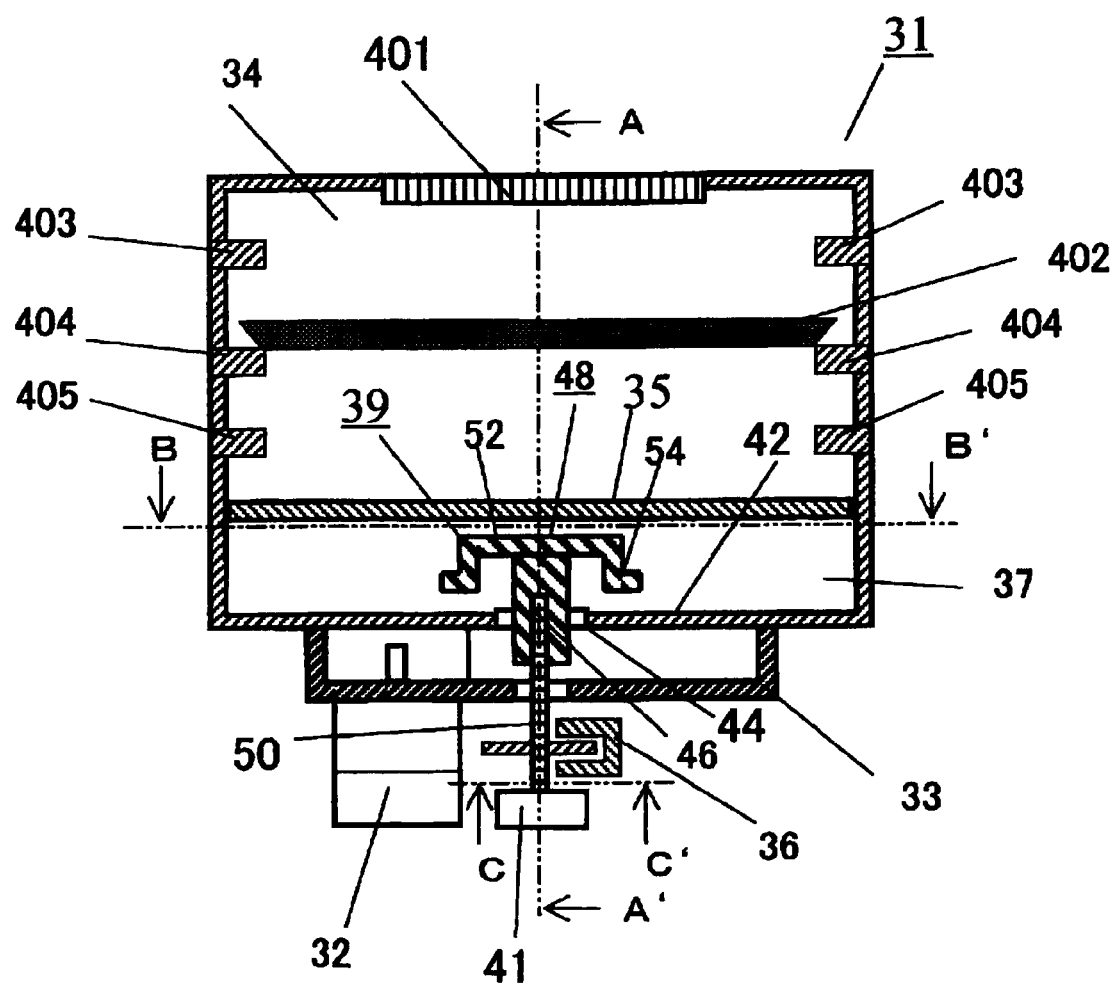
FIG. 1 A front sectional configurative view of a microwave oven according to Embodiment 1 of the present invention.

DESCRIPTION OF REFERENCE NUMERALS 31 microwave oven (microwave heating apparatus)
32 magnetron (microwave generating means)
33 waveguide
34 heating chamber
35 loading table
37 antenna space
39 rotation antenna
41 motor (driving means)
411 controlling means

BEST MODE FOR CARRYING OUT THE INVENTION

Embodiments according to the present invention will be explained in detail with reference to the drawings hereinafter.

Embodiment 1

Figure 2:
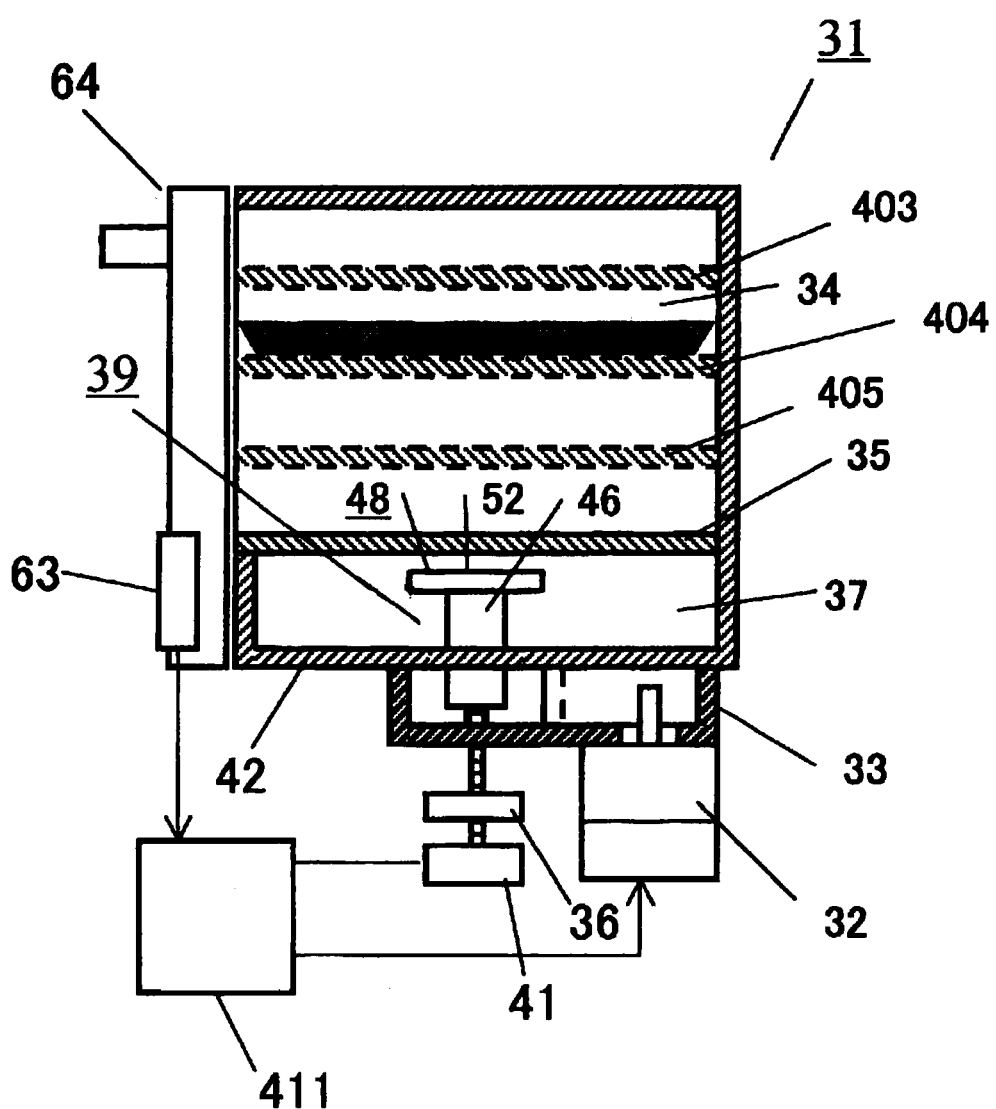
FIG. 2 A side sectional configurative view of the microwave oven according to Embodiment 1 of the present invention (a sectional view taken along an A-A' line in FIG. 1).
Figure 3:
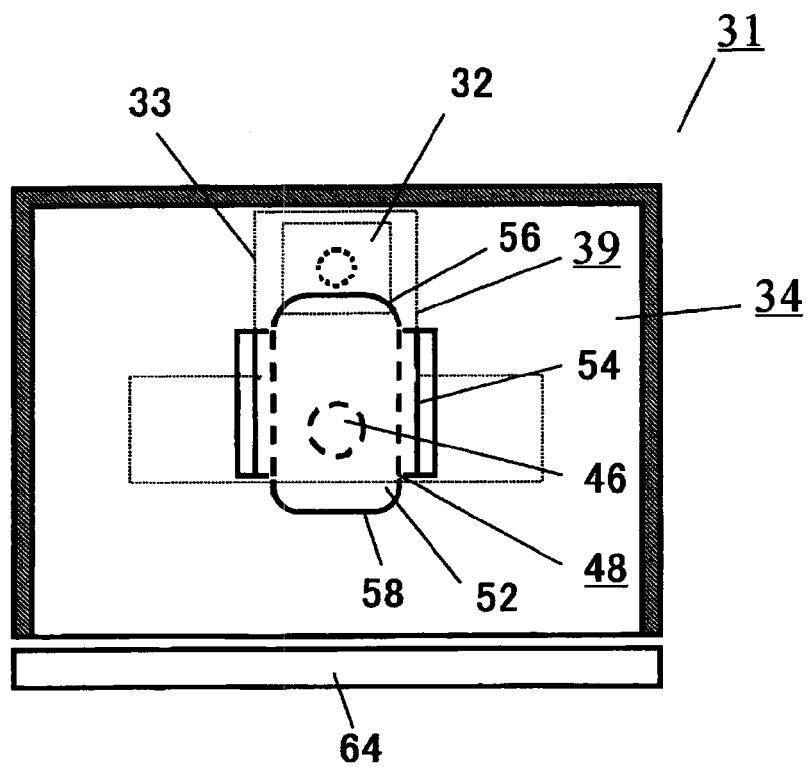
FIG. 3 A view explaining the direction of a rotation antenna when a heating plate being put on an upper stage is heated (a sectional view taken along a B-B' line in FIG. 1).
Figure 6:
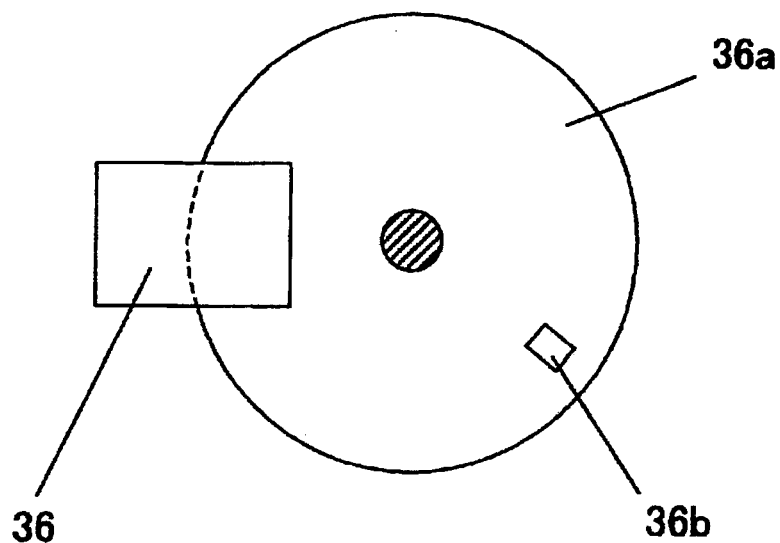
FIG. 6 A view explaining an origin detecting mechanism of the rotation antenna (a sectional view taken along a C-C' line in FIG. 1).

FIG. 1 to FIG. 3 are configurative views of a microwave oven 31 as a representative microwave heating apparatus according to the present invention, wherein FIG. 1 is a sectional view when viewed from the front side, FIG. 2 is a sectional view taken along an A-A' line in FIG. 1, and FIG. 3 is a sectional view taken along a B-B' line in FIG. 1, and FIG. 6 is a sectional view taken along a C-C' line in FIG. 1.

As shown in FIG. 1, a microwave oven 31 includes a waveguide 33 for transmitting the microwave radiated from a magnetron 32 as a representative microwave generating means, a heating chamber 34 connected to an upper portion of the waveguide 33 and having a shape whose width dimension (about 410 mm) is larger than a depth dimension (about 315 mm), a loading table 35 fixed in the heating chamber 34 into which a food (not shown) as a representative subject to be heated is put and made of the low-loss dielectric material such as ceramic or glass to transmit the microwave easily, an antenna space 37 formed below the loading table 35 in the heating chamber 34, a rotation antenna 39 fitted to the antenna space 37 to radiate the microwave propagated through the waveguide 33 to the interior of the heating chamber 34, a motor 41 as a representative driving means for turning/driving the rotation antenna 39, a controlling means 411 for controlling the direction of the rotation antenna 39 by controlling the motor 41, and a photo interrupter 36 constituting an origin detecting mechanism for detecting an origin of turn of the rotation antenna 39.

Also, a heater 401 for performing the electric heating is provided to an upper surface portion of the heating chamber 34. Also, the heating chamber 34 has plate bearing portions for supporting a heating plate 402 respectively at three stages. Concretely, the heating chamber 34 has an upper stage plate bearing portion 403, a middle stage plate bearing portion 404, and a lower stage plate bearing portion 405. The heating plate 402 has a high-frequency absorber (e.g., ferrite) on the back surface side (the loading table 35 side) on which the subject to be heated is not put.

Also, the microwave oven 31 has a door 64, as shown in FIG. 2. Also, an operating portion 63 is arranged on a lower portion of the door 64. A user can choose various cooking menus via the operating portion 63 in accordance with the food or the cooked contents. For example, the user can set a heating time and choose the previously set cooking menu such as the "hot-up menu", the "grill menu", or the like via the operating portion 63.

The "hot-up menu" offers a cooking method of heating the food by radiating the microwave to the food. The "grill menu" offers either a cooking method of heating the food via the heating plate by raising a temperature of the heating plate on which the food is put or a cooking method of heating the food by a combination of the heating plate whose temperature is raised and the grilling heater.

The controlling means 411 controls the magnetron 32 and the motor 41 based on an output signal from the operating portion 63.

The rotation antenna 39 is constructed to have the radiation directivity. The microwave oven 31 of Embodiment 1 is constructed such that the heating plate 402 is heated concentratedly by controlling the sharp part of the radiation directivity of the rotation antenna 39 in the predetermined direction. It will be described later how the rotation antenna should be controlled concretely.

Also, the rotation antenna 39 has a coupling portion 46, and a radiating portion 48. This coupling portion 46 is formed of the almost circular cylindrical conductive material of about 18 mm diameter to pass through an almost circular coupling hole 44 of about 30 mm diameter provided on the boundary face between the waveguide 33 and a heating chamber bottom surface 42. This radiating portion 48 is formed of the conductive material having roughly a wider area in the horizontal direction than that in the vertical direction, and is connected electrically to an upper end of the coupling portion 46.

Also, the rotation antenna 39 is constructed such that the coupling portion 46 is fitted on a shaft 50 of the motor 41 to make a center of the coupling hole 44 coincide with a center of turning/driving. The radiating portion 48 is constructed to have the radiation directivity since its shape is not uniform in the turning direction.

A turning center of the rotation antenna 39 is arranged at a center of the interior of the heating chamber 34. The waveguide 33 constitutes a T-shape when viewed from the top in FIG. 3, and has a bilaterally symmetrical shape.

The radiating portion 48 is constructed such that four corners of a tetragon of a radiating portion upper surface 52 are rounded, and a radiating portion bent portion 54 being bent toward the heating chamber bottom surface 42 side is provided to two opposing sides respectively to limit the radiation of the microwave to the outside of two sides. A distance between the heating chamber bottom surface 42 and the radiating portion upper surface 52 is set to about 10 mm, and the radiating portion bent portion 54 is pulled down to a position that is lower than the upper surface 52 by about 5 mm.

Also, remaining two sides has a different length from the coupling portion 46 to the end portion in the horizontal direction respectively, and constitute an end portion 56 whose length from the center of the coupling portion is about 75 mm and an end portion 58 whose length from the center of the coupling portion is about 55 mm. Also, both dimensions of the end portions in the width direction are set to 80 mm or more. According to this configuration, the rotation antenna 39 can sharpen the radiation directivity in the direction from the coupling portion 45 to the end portion 58.

In this configuration, when the "hot-up menu" heats the common food uniformly, a place where the heating apparatus is put in is not particularly worried about like the traditional microwave oven, and also the rotation antenna 39 may be turned at a constant speed like the known art.

In contrast, when the food put on the heating plate 402 is heated by the "grill menu", an operation of the rotation antenna 39 is stopped in a state that the end portion 58 of the rotation antenna 39 is directed to a predetermined position.

This predetermined position is decided depending on relationships between a size of the heating chamber and a position of the heating plate, and others, and should be found in advance based on the experiment. For example, when the result showing the fact that the microwave is concentrated to the heating plate 402 being put on the upper stage plate bearing portion 403 and a temperature of the heating plate 402 is raised effectively has been obtained as the result of experiment in a situation that, as shown in FIG. 3, the end portion 58 of the rotation antenna 39 is directed to the door 64 (the front direction), such position is stored in the controlling means 411 as a stop position of the rotation antenna 39 when the heating plate 402 is put on the upper stage plate bearing portion 403.

In the microwave oven 31 of Embodiment 1, the controlling means 411 stores angle information (stop position) of the rotation antenna 39 on a basis of an origin that the origin detecting mechanism having the photo interrupter 36 has detected. In the microwave oven 31 of Embodiment 1, a position of the rotation antenna 39 in which the end portion 58 of the rotation antenna 39 is directed toward the door 64, as shown in FIG. 3, is set as an origin position (0 degree).

Figure 4:
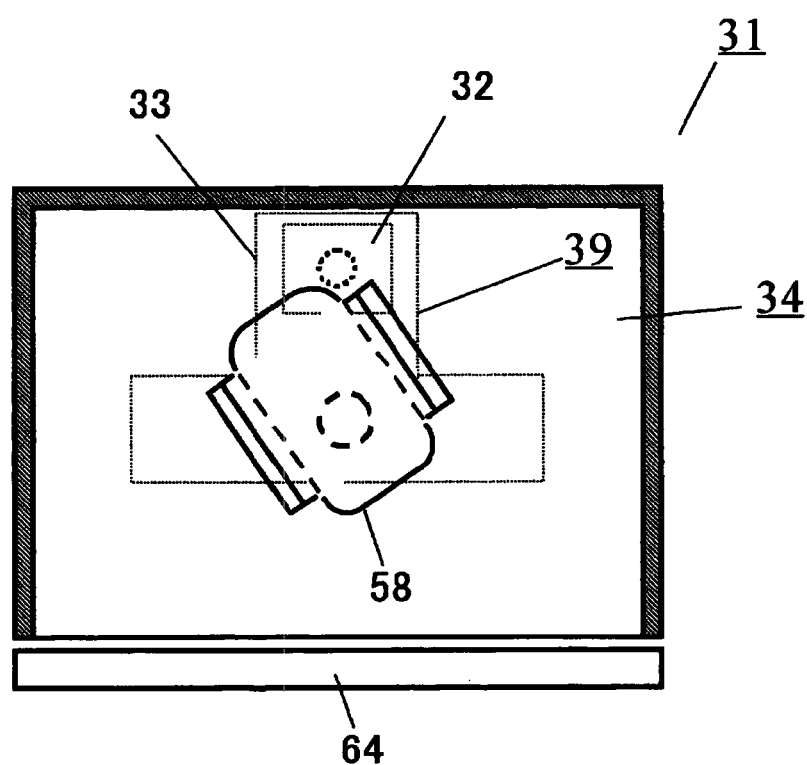
FIG. 4 A view explaining the direction of the rotation antenna when the heating plate being put on a middle stage is heated.

Also, when the result showing the fact that the microwave is concentrated to the heating plate 402 being put on the middle stage plate bearing portion 404 and a temperature of the heating plate 402 is raised effectively has been obtained in a situation that, as shown in FIG. 4, the end portion 58 of the rotation antenna 39 is directed to the right side of the heating chamber 34, the controlling means 411 of the microwave oven 31 stores such position (45 degree from the origin in the anticlockwise direction) as a stop position of the rotation antenna 39 when the heating plate 402 is put on the middle stage plate bearing portion 404.

Figure 5:
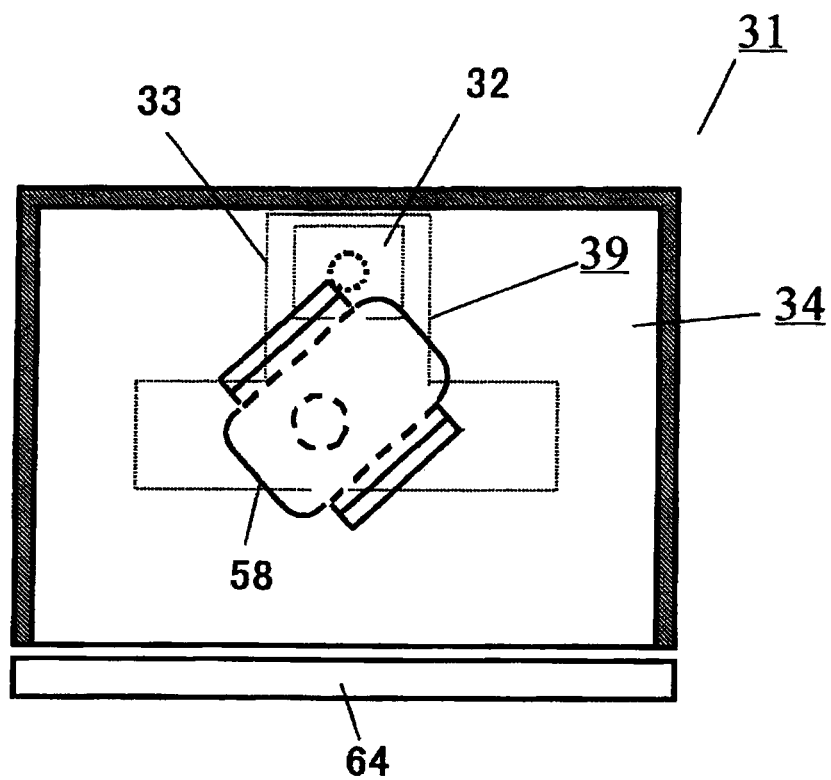
FIG. 5 A view explaining the direction of the rotation antenna when the heating plate being put on a lower stage is heated.

Also, when the result showing the fact that the microwave is concentrated to the heating plate 402 being put on the lower stage plate bearing portion 405 and a temperature of the heating plate 402 is raised effectively has been obtained in a situation that, as shown in FIG. 5, the end portion 58 of the rotation antenna 39 is directed to the left side of the heating chamber 34, the controlling means 411 of the microwave oven 31 stores such position (315 degree from the origin in the anticlockwise direction) as a stop position of the rotation antenna 39 when the heating plate 402 is put on the lower stage plate bearing portion 405.

As described above, the microwave oven 31 of Embodiment 1 controls the direction of the rotation antenna in accordance with a position of the heating plate. In order to direct the rotation antenna 39 in a predetermined direction, a stepping motor may be used as the motor 41, a means for controlling a current-supply time of a constant-speed motor by detecting a reference position may be used, and the like.

In the microwave oven 31 of Embodiment 1, a stepping motor may be used as the motor 41 and the origin detecting mechanism is provided to the shaft 41 of the motor. As shown in FIG. 6, this origin detecting mechanism is constructed by a circular plate 36a having the shaft as a center axis and the photo interrupter 36. A rectangular slit 36b is provided in the circular plate 36a.

The circular plate 36a is fitted to the shaft 59 of the motor that turns the rotation antenna 39. The circular plate 36a is turned to interrupt an optical path of the photo interrupter 36 having a light emitting element and a light receiving element.

According to this configuration, when the slit 36b passes through the optical path of the photo interrupter 36, the optical path is not shut out, and thus a point of time when the slit passes through the optical path can be detected. Therefore, if a position of the slit 36b is set previously as an origin of the rotation antenna 39, the photo interrupter 36 being fitted to the motor can detect such origin of the rotation antenna.

Figure 7:
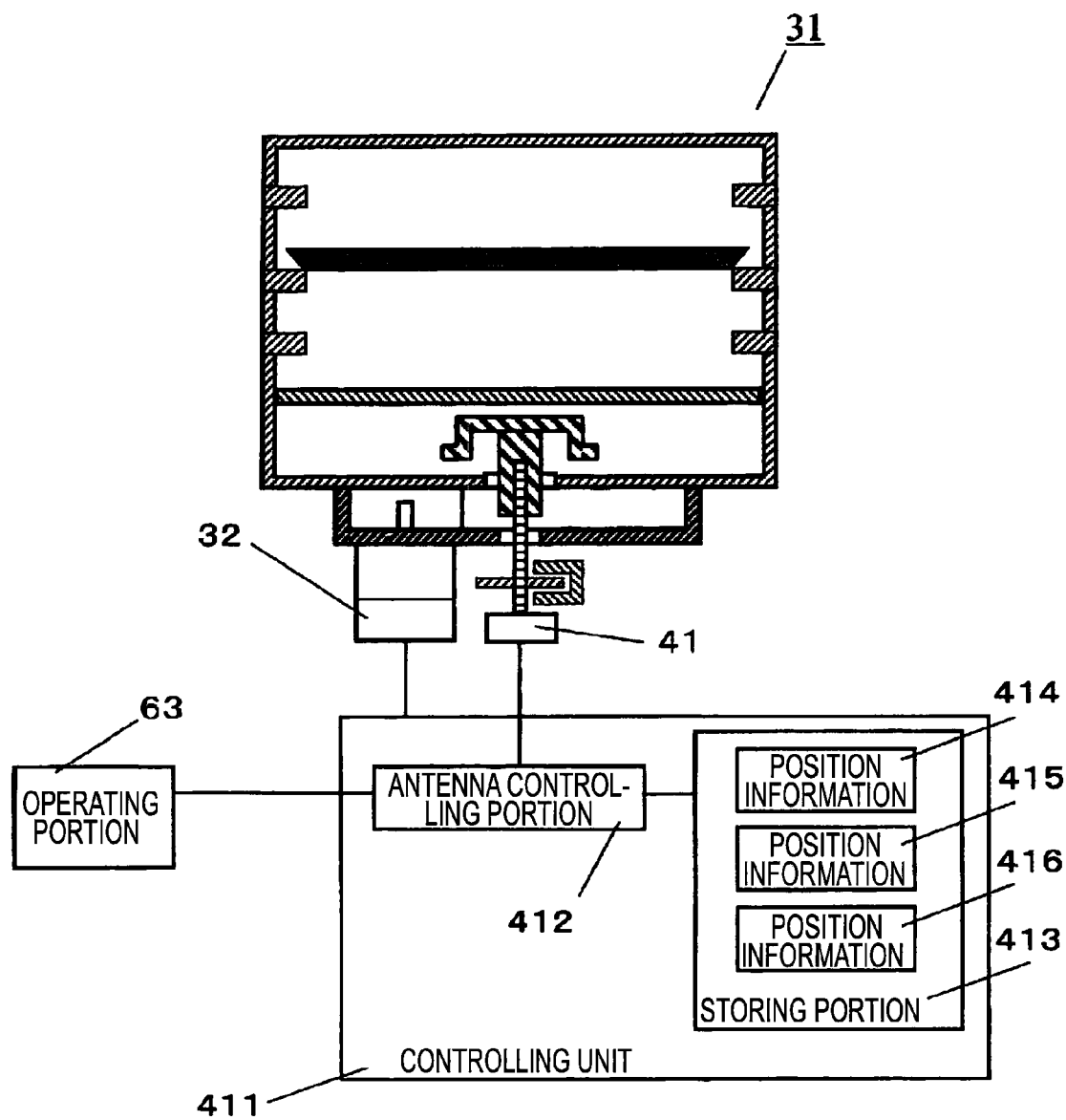
FIG. 7 A schematic configurative view of a controlling means 411.

Next, a configuration of the controlling means 411 will be explained hereunder. As shown in FIG. 7, the controlling means 411 has an antenna controlling portion 412 for controlling an operation of the rotation antenna 39 by controlling an operation of the motor 41, and a storing portion 413 for storing position information (angle information) of the rotation antenna 39.

The antenna controlling portion 412 refers to necessary information in the storing portion 413 in response to a command signal from the operating portion 63, and controls the motor 41. The storing portion 413 stores position information of the rotation antenna 39 suitable for the heating of the heating plate 402 every (upper, middle, lower) position on which the heating plate 402 is put in the heating chamber. Concretely, the storing portion 413 stores position information 414 (origin) for the upper stage plate bearing portion, position information 415 (45 degree from the origin in the anticlockwise direction) for the middle stage plate bearing portion, and position information 416 (315 degree from the origin in the anticlockwise direction) for the lower stage plate bearing portion.

Figure 8:
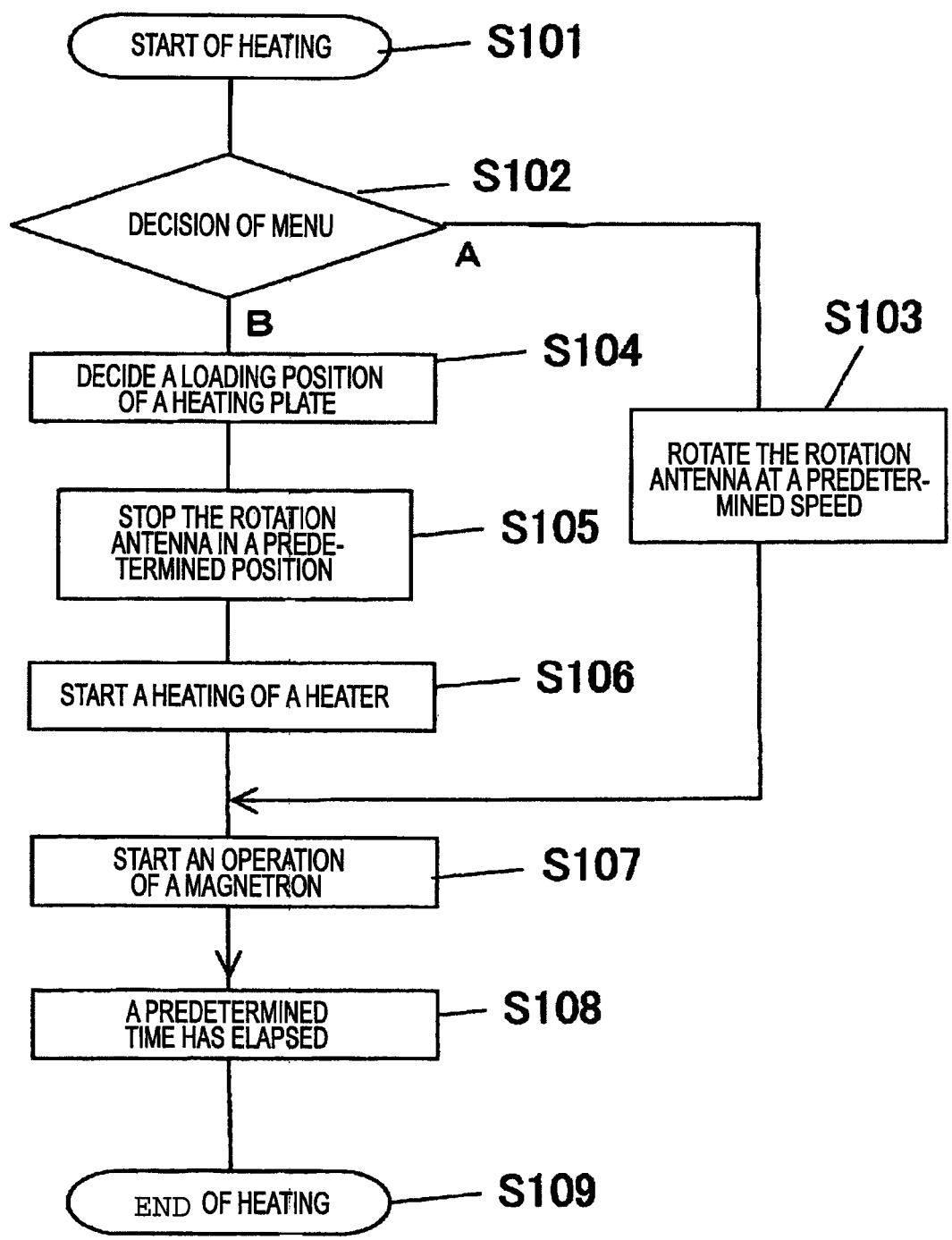
FIG. 8 An operational flowchart of the microwave oven according to Embodiment 1 of the present invention.

Next, an operation of the microwave oven 31 of Embodiment 1 of the present invention will be explained with reference to FIG. 8 hereinafter.

First, the microwave oven 31 is brought into a standby state by turning ON a power supply (S101). Then, a user chooses the "hot-up menu", the "grill menu", or the like according to the contents of the subject to be heated (the type of food) to be heated (S102). If the "hot-up menu" is chosen (S102-A), the operating portion 63 outputs a signal informing that the "hot-up menu" is chosen, to the antenna controlling portion 412.

The antenna controlling portion 412, when received the output signal, turns the rotation antenna 39 at a predetermined speed by turning the motor 41 at a constant speed (S103). Then, the controlling means 411 starts a heating process by operating the magnetron 32 (S107). After a predetermined time has elapsed (S108), the controlling means 411 stops the operation of the rotation antenna 39, the magnetron 32, etc. Then, the heating process of the "hot-up menu" is ended (S109).

In contrast, if the "grill menu" is chosen (S102-B), the operating portion 63 outputs a signal informing that the "grill menu" is chosen, to the antenna controlling portion 412. The antenna controlling portion 412, when received the output signal, decides on which one of upper stage, middle stage, and lower stage positions the heating plate 402 is now loaded, based on the output signal (S104). In the "grill menu", the type of the grilled subject such as fish, dark meat, roast beef, roast chicken, pizza, paella, or the like can be chosen, and any one of upper stage, middle stage, and lower stage positions of the heating plate is stored previously to correspond to the type of the grilled subject. As a result, the position of the heating plate is decided when the type of the grilled subject is chosen on the "grill menu". But a decision of the loading position is not limited to this mode. For example, a detecting means may be provided to respective plate bearing portions, and the plate position may be decided by a signal from this detecting means.

Then, the antenna controlling portion 412 refers to the corresponding position information in the storing portion 413 based on position information decided in S104, and controls the motor 41. For example, when the operating portion 63 chooses the upper stage loading position on the "grill menu", the antenna controlling portion 412 controls the motor 41 by referring to the position information 414, then turns the rotation antenna 39 to the position that has 90 degree from the origin in the anticlockwise direction, and then stops the rotation antenna 39 in that position (S105).

After the rotation antenna 39 is stopped in a predetermined position, the controlling means 411 starts the heating of the heater 401 (S106). Then, the controlling means 411 starts the heating process by operating the magnetron 32 (S107). After a predetermined time has elapsed (S108), the controlling means 411 stops the operation of the rotation antenna 39, the heater 401, the magnetron 32, etc. Then, the heating process of the "grill menu" is ended (S109).

With the above configuration, the microwave oven 31 of Embodiment 1 has three (upper stage, middle stage, lower stage) plate bearing portions in the heating chamber 34. Therefore, the cooking menu can be chosen according to the stage position and various foods can be heated/cooked by the "grill menu".

For example, the upper stage (the plate bearing portion 403) is used in the case of the thin food material such as fish, dark meat, or the like to which the typical grill cooking is applied. The middle stage (the plate bearing portion 404) is used in the case where the big food material such as roast beef, roast chicken, or the like should be cooked. In the case of the lower stage (the plate bearing portion 405), a cooking performance can be improved by keeping a distance from the upper surface heater in such a situation, e.g., pizza, paella, or the like, that a back surface heating power is needed but an upper surface heating power should be made soft.

Also, the microwave oven 31 of Embodiment 1 can bake the back surface of the cooked subject since the ferrite as the high frequency absorber adhered to the back surface of the heating plate 402 can absorb the high-frequency power and generate a heat. Also, this microwave oven 31 can execute an upper surface cooking by the heating from the heater since the heater is arranged on the top of the heating chamber. Further, this microwave oven 31 can control the position of the rotation antenna in the high-frequency heating apparatus according to the stage position to heat effectively the back surface of the heating plate 402.

Because a high-frequency waveform varies according to the position on which the heating plate 402 is put, a temporary stop position of the rotation antenna 39 becomes different. In this event, such stop position is decided previously by the experiment as described above, and is stored in the storing portion 413. The stop position of the rotation antenna 39 can be controlled precisely by providing the origin detecting mechanism to the motor 41, so that the heating can be realized with maximum efficiency in respective stage positions and also a quantity of the microwave propagating to an upper space (a space in which the food is loaded) over the heating plate can be reduced. As a result, it can be prevented that moisture inside the food is evaporated excessively.

Figure 9A:
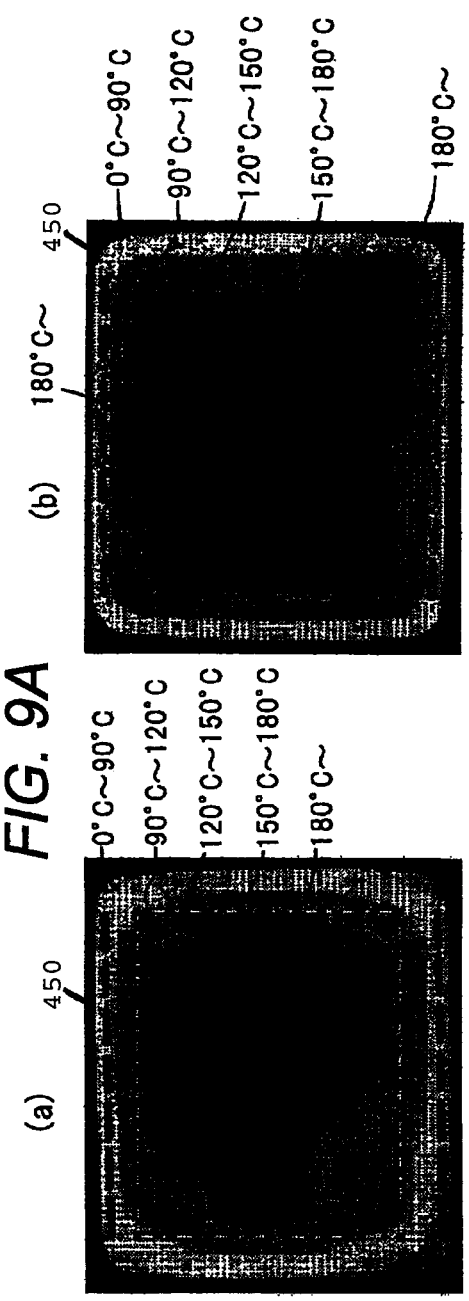
FIG. 9A A comparative view of a temperature distribution of the heating plate in the known art and the heating plate according to the present invention (upper stage).
Figure 9A:
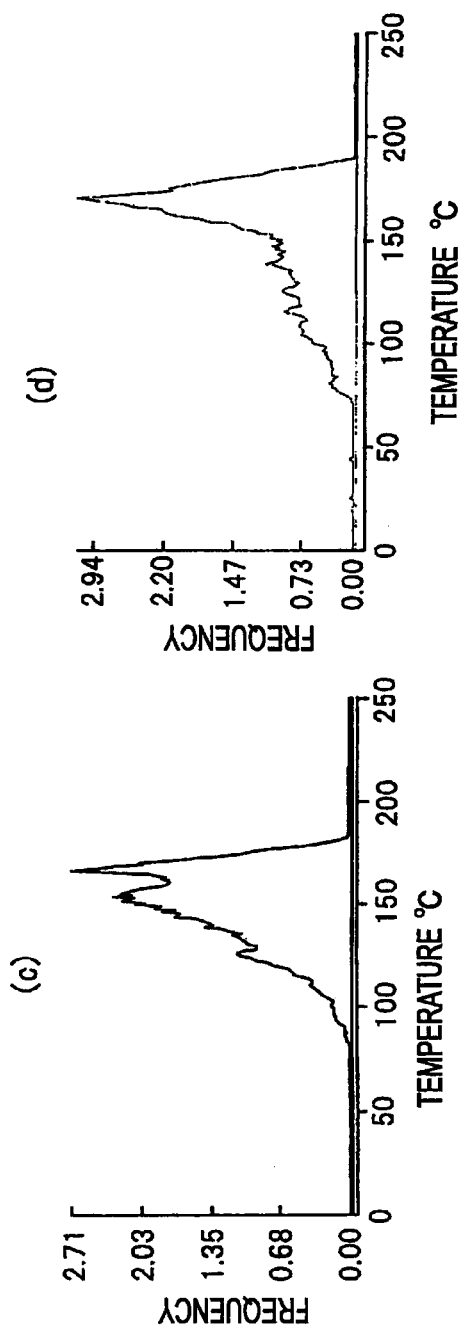

FIG. 9A is a view comparing a temperature distribution of the heating plate in the known art and a temperature distribution of the heating plate of the present invention when the heating plate is placed at the upper stage of the heating chamber. In FIG. 9A, (a) shows a temperature distribution of the heating plate in the known art. In FIG. 9A, (b) shows a temperature distribution of the heating plate of the present invention. In FIG. 9A, (c) is a graph showing a frequency of the temperature distribution of the heating plate in the known art. In FIG. 9A, (d) is a graph showing a frequency of the temperature distribution of the heating plate according to the present invention. Here, the "frequency" signifies a rate of an area at a predetermined temperature among the whole area of the heating plate.

The comparison is made based on the experimental results while changing only the operation of the rotation antenna under the condition that the operation conditions of the magnetron are kept identically. In comparison between (a) in FIG. 9A and (b) in FIG. 9A, the range of 90° C. to 120° C. is distributed along an outer edge of a food loading portion 450 of the heating plate in both Figures. In contrast, the range of 120° C. to 180° C. is not distributed on a part (the lower left portion in FIG. 9A (a)) of the food loading portion 450 on the heating plate in the known art whereas such range is distributed over the whole food loading portion 450 on the heating plate in the present invention. In other words, the heating plate of the present invention can be kept uniformly in a high temperature state as a whole.

Also, in comparison between (c) in FIG. 9A and (d) in FIG. 9A, a peak in a graph in FIG. 9A (d) is positioned in a higher temperature range than that in a graph in FIG. 9A (c). It can be appreciated from this result that the heating plate of the present invention can distribute widely a high-temperature range in contrast to the heating plate in the known art.

Figure 9B:
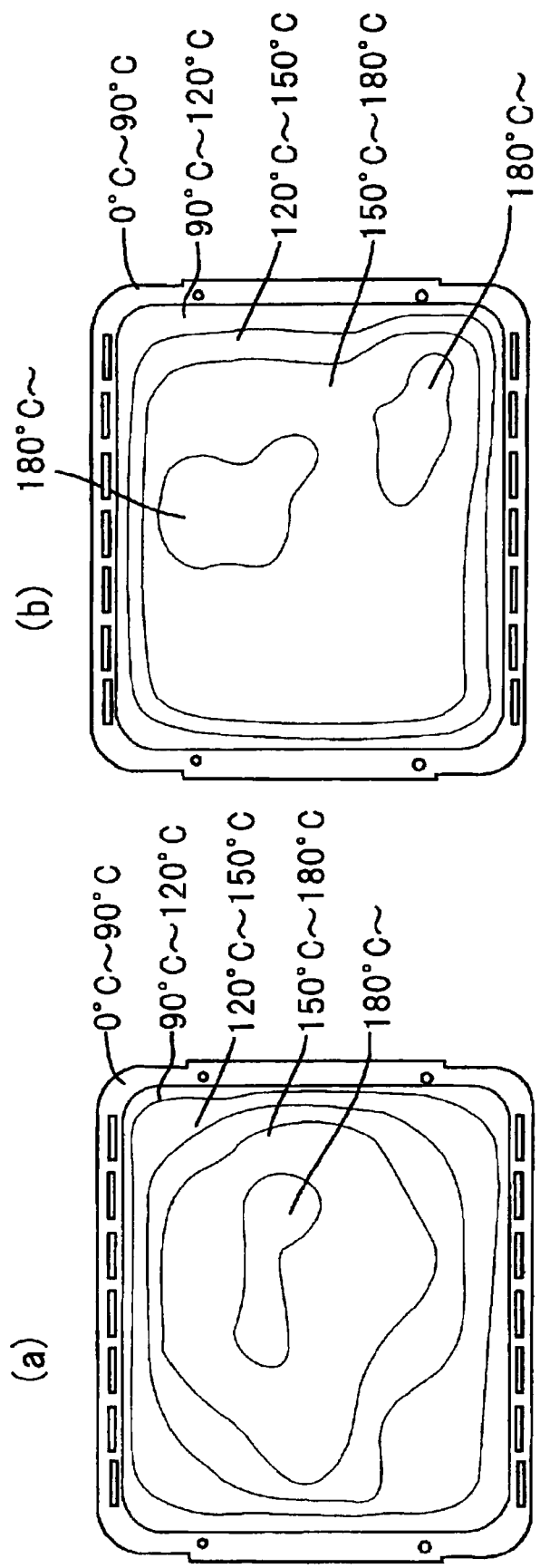
FIG. 9B A reference view of FIG. 9A.

FIG. 9B shows the temperature distribution in FIG. 9A by using a contour line, for the purpose of reference. (a) in FIG. 9B corresponds to (a) in FIG. 9A, and shows the temperature distribution of the heating plate in the known art. (b) in FIG. 9B corresponds to (b) in FIG. 9A, and shows the temperature distribution of the heating plate of the present invention.

Also, it can be confirmed from this comparison result that, when the heating plate is loaded on the upper stage of the heating chamber, a heating efficiency of the heating plate can be improved on the "grill menu" by stopping the rotation antenna in a predetermined position.

Figure 10A:
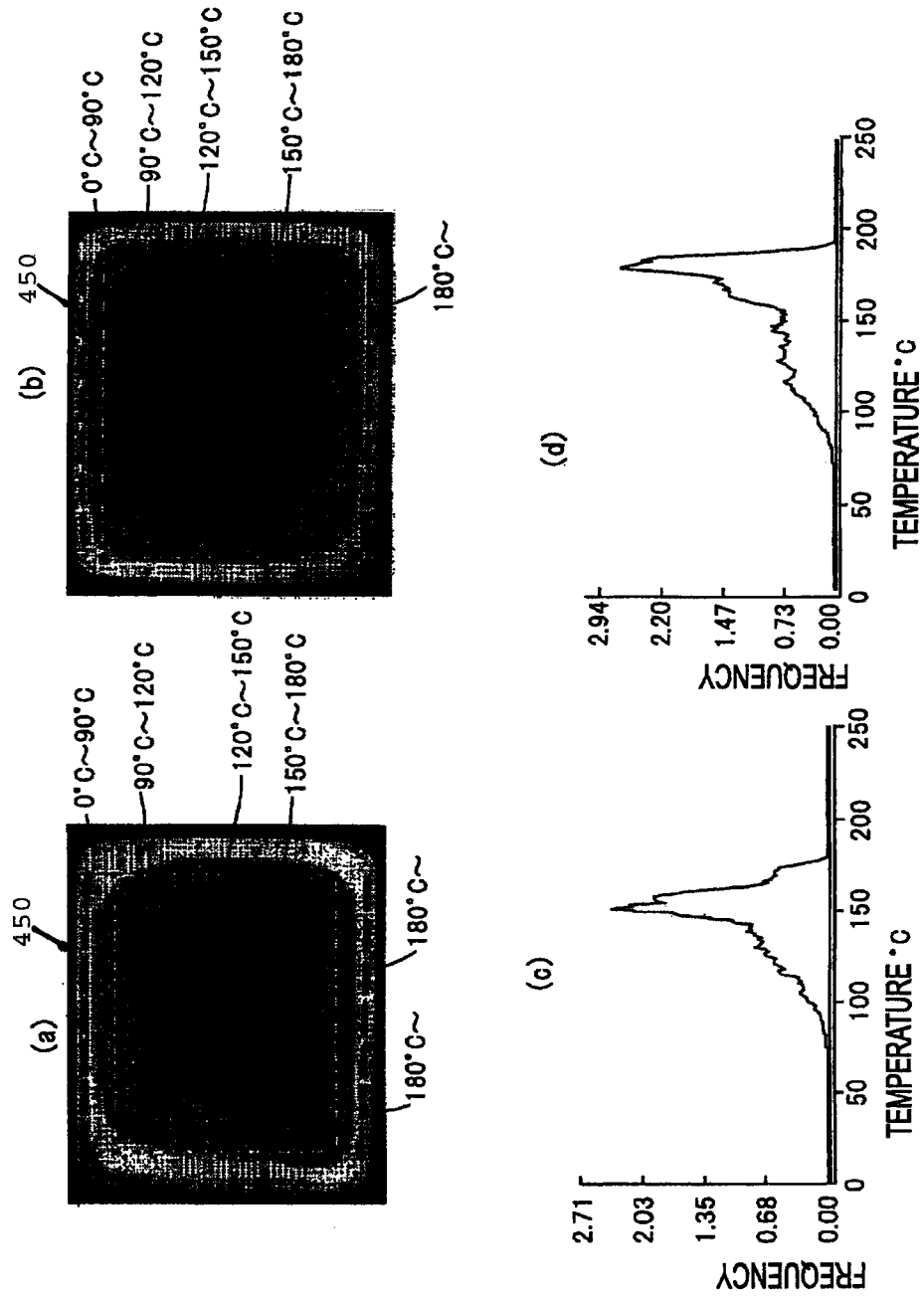
FIG. 10A A comparative view of a temperature distribution of the heating plate in the known art and the heating plate according to the present invention (lower stage).

FIG. 10A is a view comparing a temperature distribution on the heating plate in the known art and a temperature distribution on the heating plate of the present invention when the heating plate is placed at the lower stage of the heating chamber. (a) in FIG. 10A shows a temperature distribution on the heating plate in the known art. (b) in FIG. 10A shows a temperature distribution on the heating plate of the present invention. (c) in FIG. 10A is a graph showing a frequency of the temperature distribution on the heating plate in the known art. (d) in FIG. 10A is a graph showing a frequency of the temperature distribution on the heating plate of the present invention.

In comparison between (a) in FIG. 10A and (b) in FIG. 10A, the range of 20° C. to 180° C. is distributed over the whole food loading portion 450 on the heating plate in the present invention in contrast to the heating plate in the known art. In other words, the heating plate of the present invention can be kept uniformly in a high temperature state as a whole. Also, the heating plate of the present invention can distribute widely the range of 180° C. or more, Also, in comparison between (c) in FIG. 10A and (d) in FIG. 10A, a peak in a graph in FIG. 10A (d) is positioned in a higher temperature range than that in a graph in FIG. 10A (c). It can be appreciated from this result that the heating plate of the present invention can distribute widely a high-temperature range in contrast to the heating plate in the known art.

FIG. 10B shows the temperature distribution in FIG. 10A by using a contour line, for the purpose of reference. (a) in FIG. 10B corresponds to (a) in FIG. 10A, and shows the temperature distribution of the heating plate in the known art. (b) in FIG. 10B corresponds to (b) in FIG. 10A, and shows the temperature distribution of the heating plate of the present invention.

Also, it can be confirmed from this comparison result that, when the heating plate is loaded on the upper stage of the heating chamber, a heating efficiency of the heating plate can be improved on the "grill menu" by stopping the rotation antenna in a predetermined position.

From these results, it can be understood that, when the operation of the rotation antenna on the "grill menu" is stopped in the optimum position every stage position respectively, the heating can be realized with maximum efficiency in respective stage positions In the explanation of the microwave oven 31 of Embodiment 1, an example in which the rotation antenna 39 is stopped during the "grill menu" is explained. But the operation control of the rotation antenna is not limited to this mode. For example, it is feared that, when the radiation of the microwave into the heating chamber is continued while the rotation antenna 39 is still stopped in a predetermined position, a temperature of the rotation antenna 39 itself is excessively raised and the rotation antenna 39 is fused.

In view of this respect, the antenna controlling portion 412 of the controlling means 411 may swing reciprocally the rotation antenna 39 within a predetermined angle (e.g., ±5 degree) around a target angle (stop position). Accordingly, the degradation of the rotation antenna 39 can be prevented not to affect substantially the heating effect to the heating plate. Also, the excessive heating caused when the microwave is concentrated into a part of the rotation antenna 39 since a stopped state of the rotation antenna is kept during the radiation of the microwave can be prevented. This reciprocating motion may be executed from a time point of start of the heating or may be executed after a predetermined time (e.g., after 30 sec to 1 min) has elapsed from a time point of start of the heating.

In order to execute this reciprocating motion, the controlling means 411 has an upper limit stop time storing portion for storing previously an upper limit time within which a stop of the rotation antenna 39 is allowed, a stop time counting portion for counting a time in which the rotation antenna 39 is stopped, and a reciprocating angle storing portion for storing an angle within which the rotation antenna 39 is swung reciprocally.

Also, the rotation antenna 39 may be turned by a predetermined angle (e.g., 5 degree) after a predetermined time (e.g., after 30 sec to 1 min) has elapsed from a time point of start of the heating on the "grill menu".

Also, for the same purpose, a turning speed of the rotation antenna 39 may be controlled. For example, the microwave may be concentrated onto the heating plate 402 by turning the rotation antenna 39 slowly around a predetermined position but turning the rotation antenna 39 at a constant speed in remaining positions. Similarly, it is decided previously based on the experiment that the microwave can be concentrated onto the heating plate when the rotation antenna should be controlled around which position and at which speed.

Also, the controlling means 411 may store a position where the rotation antenna 39 is in a predetermined stop position (angle) as an origin. Also, the controlling means 411 executes an origin detecting mode, which checks an origin of the rotation antenna 39, as well as the "hot-up menu" or the "grill menu", for example, before the heating process is executed or after the heating process is executed.

In the origin detecting mode, the controlling means 411 cannot specify an angle of the rotation antenna 39. Thus, when the microwave is still oscillated as it is, sometimes the unintended heating state is generated to cause the failure. For this reason, the controlling means 411 executes the control to stop the operation of the magnetron while the rotation antenna 39 is being driven in the origin detecting mode.

Also, the controlling means 411 executes the origin detecting mode after the heating process is ended and stands by in a non-heating state in a situation that the origin has been detected. As a result, it can be prevented that a standby time required to detect the origin occurs before the heating process is started.

Also, even when the "grill menu" is chosen, the controlling means 411 may turn the rotation antenna 39 at a constant speed in the initial stage of the heating starting, and also may shift the rotation antenna 39 to the operation control based on the position information of the storing portion 413 when a difference in the temperature distribution in the heating chamber 34 begins to occur.

Figure 11:
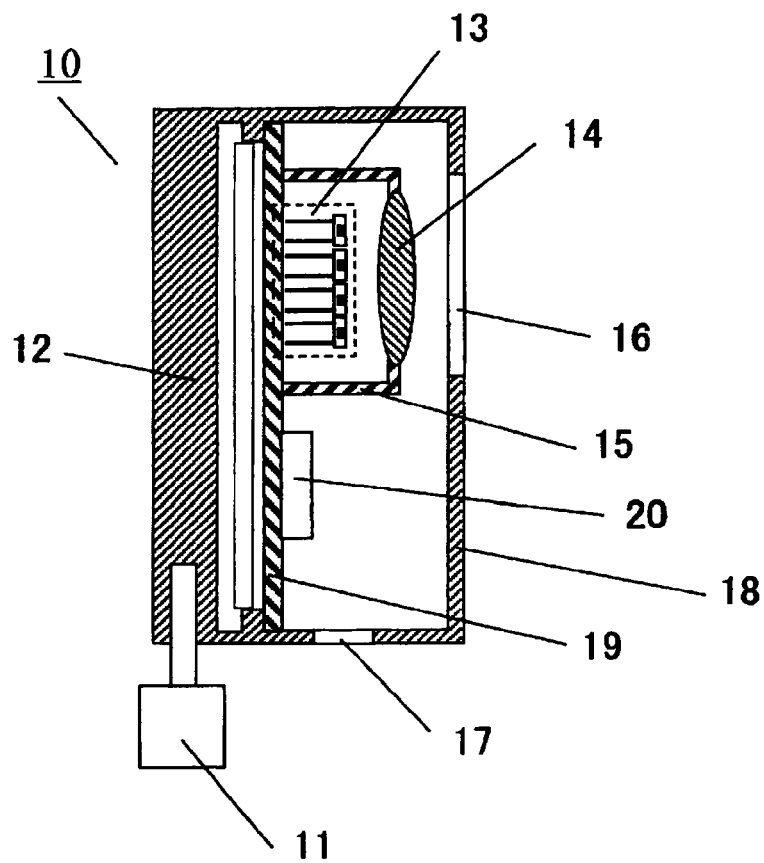
FIG. 11 A schematic configurative view of a temperature detecting means.

In order to detect the temperature distribution, a temperature detecting means shown in FIG. 11 should be provided. This temperature detecting means has a plurality of infrared detecting elements 13 aligned on a base plate 19, a case 18 for housing the overall base plate 19, and a stepping motor 11 for moving the case 18 in the direction that intersects orthogonally with the direction along which the infrared detecting elements 13 are aligned.

A metal can 15 for sealing the infrared detecting elements 13, and an electronic circuit 20 for processing an operation of the infrared detecting element are provided on the base plate 19. Also, a lens 14 for passing through the infrared ray is provided on the metal can 15. Also, an infrared ray passing hole 16 for passing through an infrared ray and a hole 17 for passing through lead wires from the electronic circuit 20 are provided on the case 18.

According to this configuration, when the stepping motor 11 is turned, the case 18 can be moved in the direction perpendicular to the direction along which the infrared detecting elements 13 are aligned. Since the stepping motor 11 as the temperature detecting means makes the reciprocating turning operation, the temperature distribution can be detected substantially from all areas in the heating chamber 34.

Figure 12:
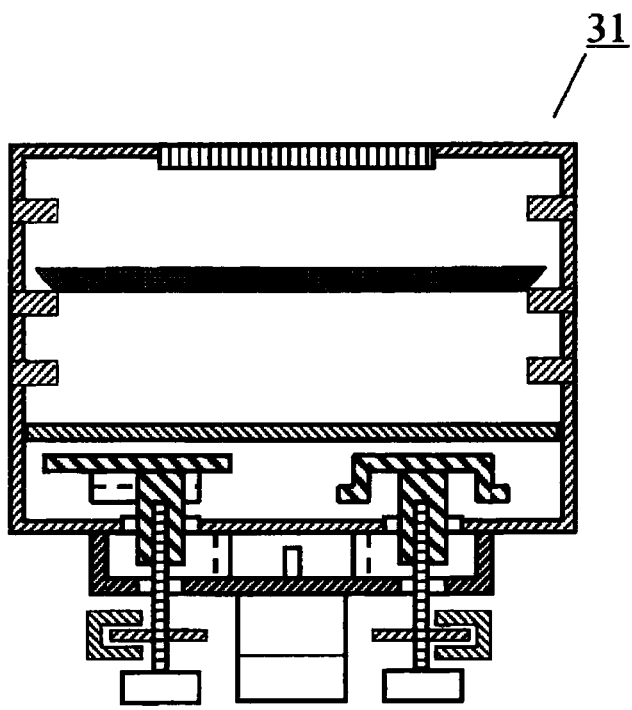
FIG. 12 A view showing a variation of the microwave oven of Embodiment 1 of the present invention (an example having two rotation antennas).
Figure 13:
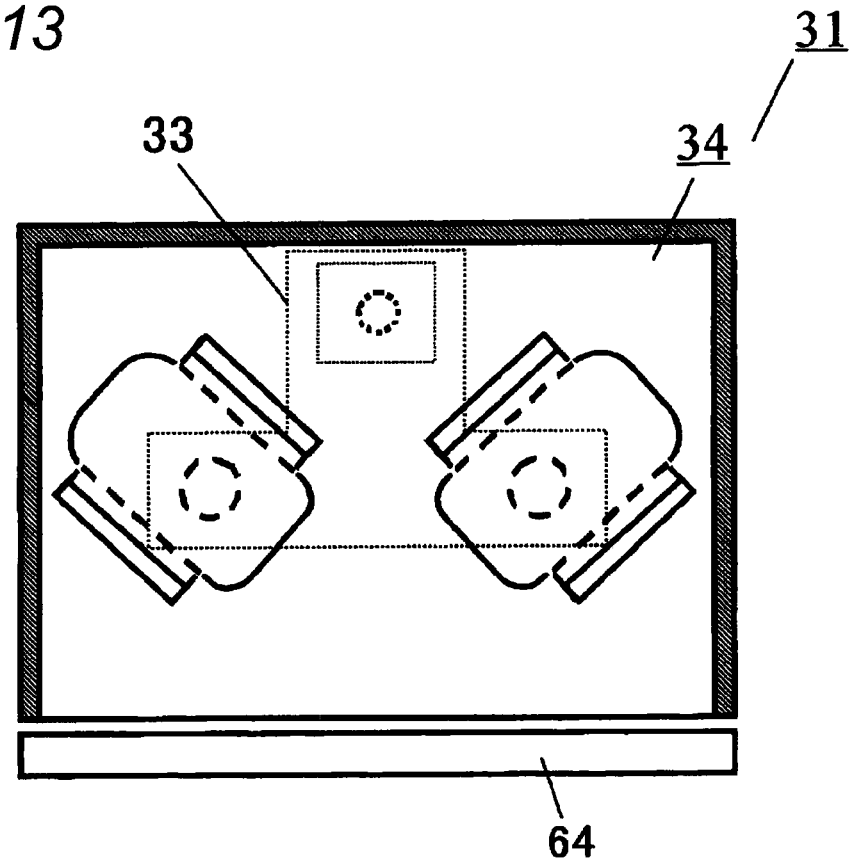
FIG. 13 A view showing the variation of the microwave oven of Embodiment 1 of the present invention (an example having two rotation antennas).

Also, the case where one rotation antenna is employed is explained. But the number of rotation antennas is not limited to this number, and the rotation antenna may be employed in plural number in excess of two. For example, as shown in FIG. 12 and FIG. 13, two rotation antennas may be arranged in the width direction of the heating chamber. In the state shown in FIG. 13, the end portions of respective rotation antennas are directed toward the center in the heating chamber. In this case, it is also decided previously based on the experiment that the microwave can be concentrated onto the heating plate when two rotation antennas should be controlled in which position relationship.

A plurality of rotation antennas enable the number of combination in stop positions of the rotation antennas to increase (for example, one rotation antenna is in the origin position, and the other rotation antenna is at 90 degree from the origin in the anticlockwise direction, or the like). Thus, the microwave can also be concentrated much more onto the high-frequency absorber of the heating plate. Therefore, a heating efficiency of the heating plate can be improved. Meanwhile, either a right half or left half area or an upper half or lower half area of the heating plate can be heated concentratedly. As a result, a variation of cooking methods can be widened.

Figure 14:
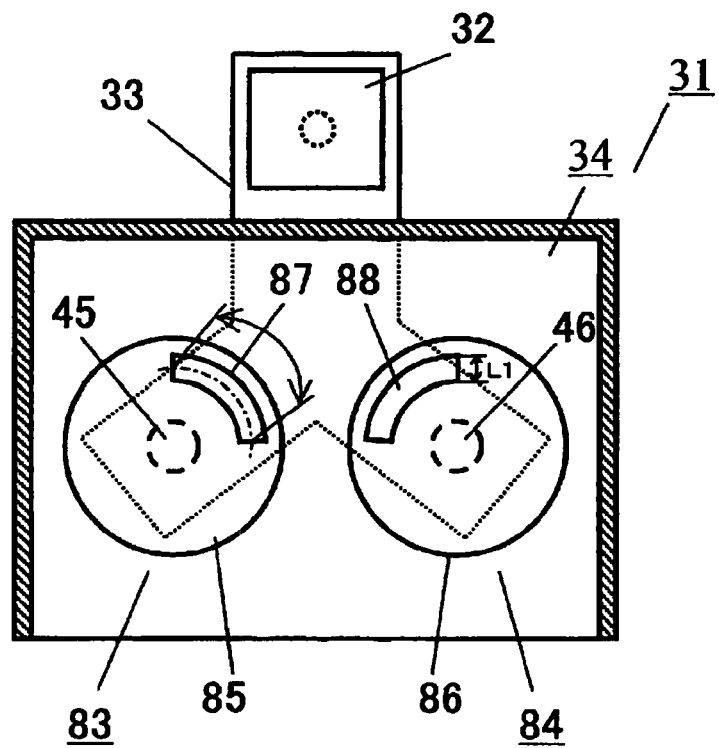
FIG. 14 A view showing a variation of the rotation antenna.

A shape of the rotation antenna is not limited to the example shown in the present embodiment. For example, as shown in FIG. 14, an antenna having an opening portion in a part of the circular plate may be employed as the rotation antenna.

Concretely, rotation antennas 83 and 84 have circular-arc shaped opening portions 87 and 88 in radiating portions 85 and 86 respectively. A length L1 of the opening portions 87 and 88 in the width direction is set to exceed or be equal to ¼ of a wavelength of the microwave radiated into the heating chamber. Accordingly, the rotation antennas 83 and 84 have the radiation directivity at the opening portions when they are stopped, so that the particular area in the heating chamber 34 can be heated locally.

Figure 15:
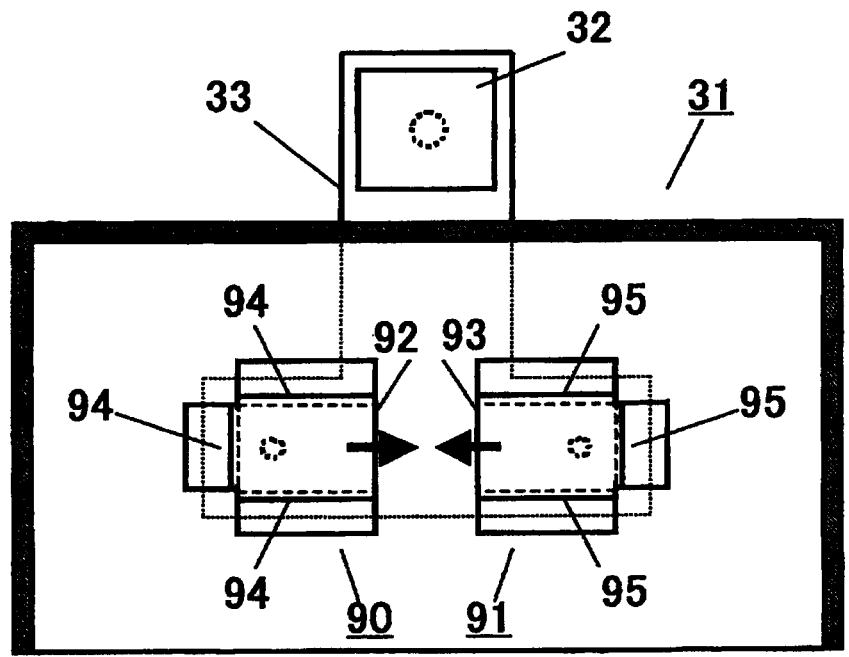
FIG. 15 A view showing another variation of the rotation antenna.

Also, as another variation of the rotation antenna, there are rectangular rotation antennas 90 and 91, for example, as shown in FIG. 15. The rotation antennas 90 and 91 have bent portions 94 and 95, each of which is bent to the bottom surface side of the heating chamber, on three sides of the rectangle respectively and have remaining one not-bent side portions 92 and 93 respectively. Therefore, the not-bent side portions 92 and 93 have the sharp directivity, so that the particular area in the heating chamber 34 can be heated locally.

Figure 16:
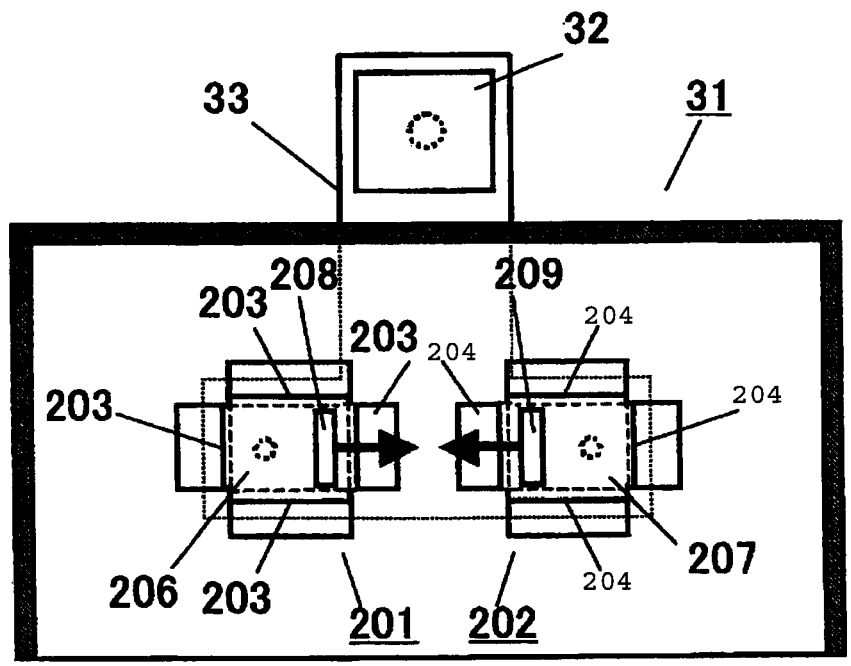
FIG. 16 A view showing another variation of the rotation antenna.
Figure 17:
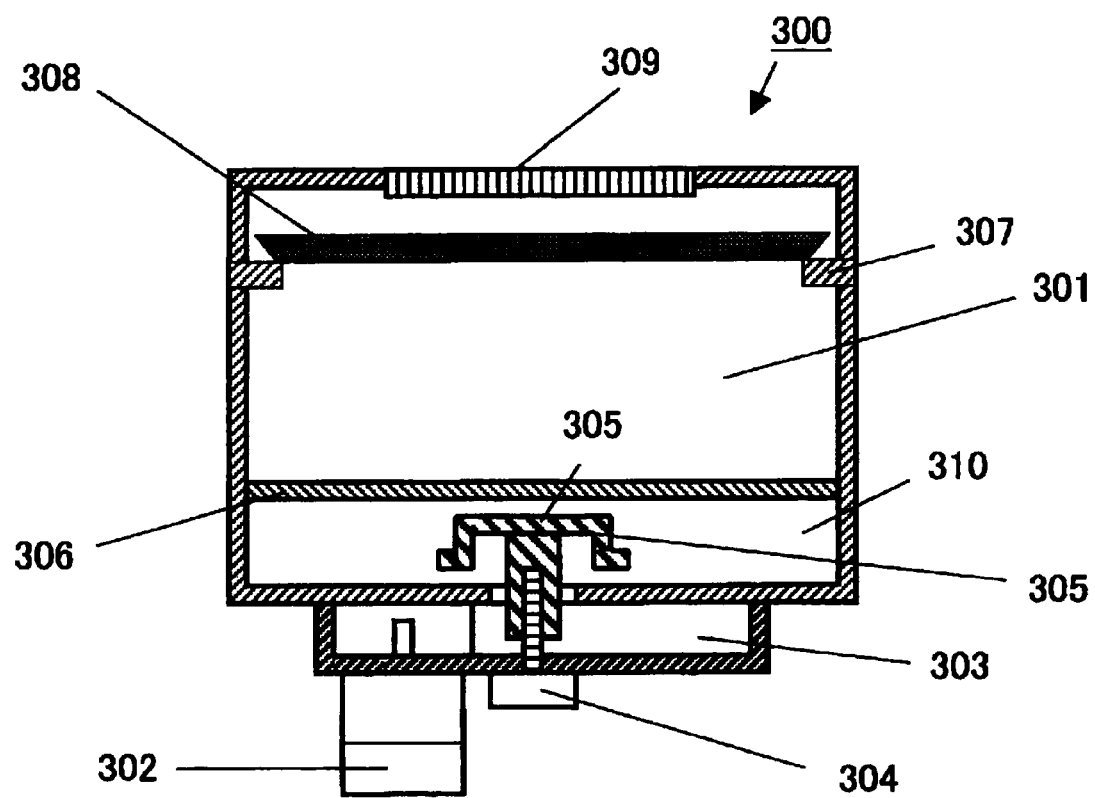
FIG. 17 A schematic configurative view of a microwave oven in the known art.

Also, as another variation of the rotation antenna, there are rectangular rotation antennas 201 and 202, for example, as shown in FIG. 16. The rotation antennas 201 and 202 have bent portions 203 and 204, each of which is bent to the bottom surface side of the heating chamber, on four sides of the rectangle respectively, and have opening portions 208 and 209 on radiating portions 206, 207. Therefore, the rotation antennas 201 and 202 have the sharp directivity, so that the particular area in the heating chamber 34 can be heated locally.

Also, respective rotation antennas are provided mutually at an interval of 5 [mm] or more. Accordingly, such a situation can be prevented that respective rotation antennas interfere with each other and a part of the rotation antennas, and the like are heated excessively and are damaged.

In this case, the embodiments described above can be implemented in various combinations.

Although the present invention is explained in detail with reference to the particular embodiments, it is apparent for those skilled in the art that various variations and modifications can be applied without departing a spirit and a scope of the present invention.

This application is based upon Japanese Patent Application (Patent Application No. 2006-169269) filed on Jun. 19, 2006; the contents of which are incorporated herein by reference.

INDUSTRIAL APPLICABILITY

As described above, the present invention can heat concentratedly the heating plate by controlling the sharp part of the radiation directivity of the rotation antenna arranged in the heating chamber in a predetermined direction. Therefore, when the grill menu is chosen, a desired cooking finish suitable for the type of the subject to be heated can be obtained and also a heating efficiency can be improved.

The invention claimed is:

1. A high-frequency heating apparatus, comprising:
   a heating chamber to which a heating plate for loading a subject to be heated thereon is detachably attached;
   a microwave generating unit;
   a waveguide for transmitting a microwave from the microwave generating unit;
   a rotation antenna for radiating the microwave into the heating chamber from the waveguide;
   a driving unit for rotating the rotation antenna;
   an operating portion capable of choosing a grill menu by which the subject to be heated put on the heating plate is heated and a hot-up menu by which the subject to be heated is heated without the heating plate; and
   a controlling unit for controlling the driving unit based on an output signal from the operating portion;
   wherein the controlling unit controls the driving unit to vary a direction of a sharp portion of a radiation directivity of the rotation antenna in response to the output signal from the operating portion, wherein the controlling unit controls the driving unit to rotate the rotation antenna to a predetermined rotation position and to oscillate the rotation antenna within a predetermined degree of the rotation of the rotation antenna around the predetermined rotation position.

2. The high-frequency heating apparatus according to claim 1, wherein the controlling unit controls the direction of the sharp portion of the radiation directivity of the rotation antenna such that the microwave is concentrated onto the heating plate when the operating portion chooses the grill menu, and controls the direction of the sharp portion of the radiation directivity of the rotation antenna such that the microwave is concentrated onto the subject to be heated when the operation portion chooses the hot-up menu.

3. The high-frequency heating apparatus according to claim 1 or claim 2,
   wherein the heating chamber includes plural stages of plate bearing portions for supporting the heating plate;
   wherein the controlling unit controls the direction of the sharp portion of the radiation directivity of the rotation antenna in accordance with a position of the heating plate supported on any one of plural stages when the operating portion chooses the grill menu.

4. The high-frequency heating apparatus according to claim 1, further comprising:
   a heating unit provided on a top of the heating chamber;
   wherein the controlling unit causes the heating unit to generate a heat when the sharp portion of the radiation directivity of the rotation antenna is directed such that the microwave is concentrated onto the heating plate.

5. The high-frequency heating apparatus according to claim 1, wherein the rotation antenna is provided on a bottom portion of the heating chamber and radiates the turn microwave from the bottom portion of the heating chamber.

6. The high-frequency heating apparatus according to claim 1, wherein the heating plate has a high-frequency absorber.

7. The high-frequency heating apparatus according to claim 1, wherein the controlling unit controls the driving unit such that the rotation antenna oscillates around the predetermined rotation position in a given angle.

8. The high-frequency heating apparatus according to claim 7, further comprising a reciprocating angle storing portion for storing the given angle, wherein the rotation antenna is swung reciprocally around the predetermined rotation position in the given angle.

9. The high-frequency heating apparatus according to claim 1, further comprising:
   an origin detecting mechanism configured to detect an original position of the rotation antenna, the origin detecting mechanism comprising a circular plate having a shaft as a center axis and a photo interrupter, the circular plate being configured to interrupt an optical path of the photo interrupter, the circular plate having a slit allowing the optical path go through the slit,
   wherein the control unit controls the driving unit to rotate the rotation antenna to a predetermined rotation position and to oscillate the rotation antenna within the predetermined degree of the rotation of the rotation antenna around the predetermined rotation position based on the detected original position of the rotation antenna.

10. The high-frequency heating apparatus according to claim 1, wherein the controlling unit controls the driving unit such that the rotation antenna oscillates within about +5 degree of the rotation of the rotation antenna from the predetermined position and about −5 degree of the rotation of the rotation antenna from the predetermined position.

11. A high-frequency heating apparatus, comprising:
    a microwave generating unit;
    a waveguide for transmitting a microwave from the microwave generating unit;
    a heating chamber to which a heating plate for loading a subject to be heated thereon is detachably attached, which is connected to an upper portion of the waveguide, and whose width direction dimension is larger than a depth direction dimension;
    a heater for electrically heating the heating chamber;
    a non-turn loading table arranged in the heating chamber to load a subject to be heated thereon;
    a heated subject housing space formed over the loading table in the heating chamber;
    an antenna space formed below the loading table in the heating chamber;
    a rotation antenna for radiating the microwave in the waveguide into the heating chamber;
    a driving unit for rotating the rotation antenna; and
    a controlling unit for controlling a direction of the rotation antenna by controlling the driving unit;
    wherein the heating plate has a ferrite of a high-frequency absorber on a side surface of the loading table,
    wherein the heating chamber has a plate bearing portion for supporting the heating plate in the heated subject housing space, and
    wherein the controlling unit controls a sharp portion of a radiation directivity of the rotation antenna to a predetermined direction such that the heating plate is concentrated heated by a high-frequency power,
    wherein the controlling unit controls the driving unit to rotate the rotation antenna to a predetermined rotation position corresponding to the predetermined direction of the sharp portion of the radiation directivity and to oscillate the rotation antenna within a predetermined degree of the rotation of the rotation antenna around the predetermined rotation position.

12. The high-frequency heating apparatus according to claim 1, wherein the rotation antenna is constructed by two rotation antennas that are arranged in symmetrical positions with respect to a width direction of the heating chamber in the antenna space, and wherein the controlling unit controls the sharp portion of the radiation directivity of at least one rotation antenna out of the two rotation antennas into a predetermined direction.

13. The high-frequency heating apparatus according to claim 1, further comprising:
   a temperature detecting unit for detecting a temperature of the subject to be heated or the heating plate in the heating chamber;
   wherein the controlling unit controls the rotation antenna based on a detected result of the temperature detecting unit.

14. The high-frequency heating apparatus according to claim 11, wherein the rotation antenna is constructed by two rotation antennas that are arranged in symmetrical positions with respect to a width direction of the heating chamber in the antenna space, and
   wherein the controlling unit controls the sharp portion of the radiation directivity of at least one rotation antenna of the two rotation antennas into a predetermined direction.

15. The high-frequency heating apparatus according to claim 11, further comprising:
   a temperature detecting unit for detecting a temperature of the subject to be heated or the heating plate in the heating chamber;
   wherein the controlling unit controls the rotation antenna based on a detected result of the temperature detecting unit.

16. The high-frequency heating apparatus according to claim 11, wherein the controlling unit controls the driving unit such that the rotation antenna oscillates around the predetermined rotation position in a given angle.

17. The high-frequency heating apparatus according to claim 16, further comprising a reciprocating angle storing portion for storing the given angle, wherein the rotation antenna is swung reciprocally around the predetermined rotation position in the given angle.

18. The high-frequency heating apparatus according to claim 11, wherein the controlling unit controls the driving unit such that the rotation antenna oscillates within about +5 degree of the rotation of the rotation antenna from the predetermined position and about −5 degree of the rotation of the rotation antenna from the predetermined position.

* * * * *